United States Patent
Mercey et al.

(10) Patent No.: US 6,898,346 B2
(45) Date of Patent: May 24, 2005

(54) ROTATING OPTICAL JOINT

(75) Inventors: Thibaut Mercey, Palaiseau (FR); Jacques Sabatier, Yvette (FR)

(73) Assignee: Air Precision, Le Plessis Robinson (FR)

( * ) Notice: Subject to any disclaimer, the term of this patent is extended or adjusted under 35 U.S.C. 154(b) by 168 days.

(21) Appl. No.: 10/376,919

(22) Filed: Feb. 28, 2003

(65) Prior Publication Data

US 2003/0210859 A1 Nov. 13, 2003

(30) Foreign Application Priority Data

Mar. 1, 2002 (FR) .......................................... 02 02617

(51) Int. Cl.[7] .............................................. G02B 6/26
(52) U.S. Cl. ....................................................... 385/26
(58) Field of Search ............................................. 385/26

(56) References Cited

U.S. PATENT DOCUMENTS

| | | | |
|---|---|---|---|
| 4,525,025 A | | 6/1985 | Hohmann et al. |
| 4,753,506 A | | 6/1988 | Einhorn et al. |
| 4,943,137 A | * | 7/1990 | Speer .......................... 385/26 |
| 5,157,745 A | | 10/1992 | Ames |
| 5,371,814 A | | 12/1994 | Ames et al. |
| 5,991,478 A | | 11/1999 | Lewis et al. |

FOREIGN PATENT DOCUMENTS

| | | | |
|---|---|---|---|
| EP | 0 218 739 A | 4/1987 | |
| EP | 0798884 A2 | * 10/1997 | .................. 385/26 |
| JP | 57-138230 A | * 8/1982 | .................. 385/26 |

OTHER PUBLICATIONS

Koch, Walter W. et al.; *Proof–of–concept model of a multichannel off–axis passive bidirectional fiber optic rotary joint*; 1988; SPIE vol. 931 Sensor Fusion, pp. 94–97.

Lewis, N. et al.; *A four channel bidirectional data link using wavelength division multiplexing*; 1985; SPIE vol. 574 Fiber Optic Couplers, Connectors, and Splice Technology II, pp. 47–54.

* cited by examiner

*Primary Examiner*—Rodney Bovernick
*Assistant Examiner*—Mike Stahl
(74) *Attorney, Agent, or Firm*—Pearne & Gordon LLP

(57) ABSTRACT

A rotating optical joint has two organs which are able to rotate independently of one other on a common axis (14). Collimators (18, 20) are mounted directly opposite one another on the organs, in an arrangement such that they permanently provide a variation of the power of the transmitted signal of less than 25%, during relative rotation of the said organs. The total number of collimators (18, 20) is preferably less than or equal to eight. Advantageously, three collimators (20) are mounted on one of the organs and four collimators (18) are mounted on the other organ.

9 Claims, 3 Drawing Sheets

ROTATING OPTICAL JOINT

TECHNICAL FIELD

The invention concerns a rotating optical joint intended to transmit data in an optical form between two organs able to rotate independently of one another on a common axis.

More precisely, the invention concerns a rotating optical joint designed to provide transmission of data in a manner which is offset from the common axis of the said organs.

Such joints can be used in many different technical fields, such as radar or tank turrets, helicopter rotors, etc.

CURRENT STATE OF TECHNOLOGY

To transmit data between two organs which must rotate independently of one another, one traditional solution consists in using rotating electrical joints.

In joints of this type, electrical signals are transmitted by mechanical parts which rub against one another.

Rotating electrical joints do however have major disadvantages. Among these disadvantages one must mention notably the wear and tear of the parts due to the mechanical contact, which requires regular servicing, the appearance of interference caused by the rubbing of the parts in contact, and the limited nature of the bandwidth of such a joint (of the order of some ten to some hundred megahertz).

Rotating optical joints enable these various problems to be resolved. They transmit the optical signals without contact, they are highly insensitive to interference and they allow a much higher transmission rate than rotating electrical joints.

Most rotating optical joints transmit signals in the axis common to the two organs which are to rotate independently of one another. They are then called "on-line" joints. In this case, two optical fibres or other light conductors are positioned facing one another on the common rotational axis.

The main disadvantage of these rotating optical joints is that they generally provide only a single transmission channel or a single optical channel.

In addition, they require that the data is transmitted in the common rotational axis, which is not satisfactory in certain special applications.

In the article by N. Lewis et al. "A four channel bidirectional data link using wavelength division multiplexing", in the periodical "Proceeding of the SPIE", published by "The International Society for Optical Engineering", vol. 574, 1985, pages 47 to 54, it was proposed to overcome the first disadvantage by using multiplexing systems. In this case, several transmission channels or optical channels transmit simultaneously in the axis of the joint.

The major disadvantage of this solution is that multiplexing requires electronics and thus an energetic contribution. In addition, data is always transmitted in the rotational axis.

Over recent years, various solutions have been proposed to transmit data in an manner offset in relation to the axis of a rotating optical joint. Joints of this type, frequently called "off-axis" joints, enable the system's axis to be left free, whilst transmitting the data in the crown of the joint. In addition, these joints are by their nature multi-channel. They thus allow several transmission channels, when this is required.

A first type of "off-axis" joint is described in the documents U.S. Pat. No. 4,525,025 and U.S. Pat. No. 5,991,478. A rotor is positioned coaxially inside a stator. One or more prisms or optical fibres mounted in the stator emit light approximately tangentially in the direction of the stator's reflecting cylindrical inner wall. The light reflected on this surface is captured by one or more receptor prisms or fibres mounted in the rotor. Use of prisms or fibres oriented in reverse directions makes the system bidirectional.

This type of joint has various disadvantages. If optical fibres are used the reception system is practically in contact with the reflecting inner wall. The latter may thus be damaged in the event of an impact. In addition, the transmission rate is limited to 50 Mbit/s for joints of a diameter of between approximately 25 and 30 cm.

Optical joints in which light signals are transmitted using prisms, in accordance with document U.S. Pat. No. 5,991,478, also have the disadvantage of being costly, due to the number of components which they contain. Moreover, the output signal is not an optical signal, but an electrical signal. Finally, the receptor requires an energetic contribution to be polarised.

Document U.S. Pat. No. 4,753,506 proposes a rotating optical joint of the "off-axis" type in which two cylindrical parts rotate in relation to one another in a common axis.

In a first configuration, one of the parts carries an emitter and several prisms distributed circumferentially so as to receive in turn the light beam from the emitter. The other part carries a receptor facing the prisms. Each of the prisms directs a conical light beam with an ellipsoidal base to the other part, so as to provide total coverage of the zone through which the receptor moves.

In another configuration, one of the parts carries a single emitter and the other part carries several receptors. In this case, the emitter directs a conical light beam with an ellipsoidal base directly to the receptors.

This known arrangement has the disadvantages that the output signal is electrical and the power must be high.

Finally, we are also familiar with the article "Proof of concept models of a multichannel off-axis passive bi-directional fiber optic rotary joint", by Koch W W et al., published in the periodical "Proceedings of the SPIE", "The International Society for Optical Engineering", volume 931, 1988, pages 94 to 97, a rotating optical joint of the "off-axis" type. In this joint, an intermediate optical element incorporating a beam of optical fibres, is interposed axially between a rotor and a stator. The latter are both fitted with optical fibres associated with collimation lenses directed at this intermediate element and regularly distributed around the axis common to the rotor and the stator. A mechanism makes the intermediate element rotate in the same direction as the rotor, at an angular speed equal to half the speed of the rotor.

Documents U.S. Pat. No. 5,157,745 and U.S. Pat. No. 5,371,814 propose comparable arrangements, in which the beam of fibres of the intermediate element is replaced by a Dove prism.

This type of rotating optical joint with an intermediate element has the major disadvantage that it requires very substantial adjustments, implementation of which is particularly delicate and difficult.

ACCOUNT OF THE INVENTION

The purpose of the invention is precisely a rotary optical joint of the "off-axis" type, preferably bidirectional, which does not have the disadvantages of joints of this type in the prior art, and which notably allows transmission of optical signals with high transmission rates (2.5 Gbit/s), in a relatively simple and inexpensive manner, and leaving free, if necessary, the region where the joint's axis is located.

In accordance with the invention, this goal is attained by means of a rotating optical joint, comprising a first organ and a second organ able to rotate independently of one another on a common axis, and at least one transmission channel of an optical signal between the said organs, with each transmission channel comprising first collimators of the light emitted from a first optical fibre, mounted on the first organ and producing ray beams approximately parallel to the common axis and offset in relation to this axis, and second collimators able to focus in a second optical fibre the collimated light from the first organ and mounted on the second organ, in which the first and second collimators are positioned approximately at an identical distance from the said common axis, characterised in that the first and second collimators are located directly opposite one another, and in such numbers and arranged such that they provide a permanent variation of the power of the transmitted optical signal of less than 25%, during relative rotation of the said organs.

The particularly simple arrangement defined above allows bidirectional transmission of optical signals, whilst leaving the central part of the joint totally free, when necessary. Thus, the first and second organs can easily be hollow along the said common axis, when required by the application.

In addition, it is possible to transmit optical signals with a high transmission-rate, of the order of 2.5 Gbit/s, which enables this type of joint to be used in the most demanding applications.

Each of the two organs of a rotating optical joint comprises a number of collimators and a number of optical fibre couplers. The function of the collimators is to transform the divergent beam into a collimated beam, in the beam's propagation direction. The optical fibre couplers, for their part, are used for dividing and subsequently for regrouping the beams.

In the preferred embodiments of the invention, the total number of the first and second collimators is less than or equal to eight. This small number enables the number of fibre optical couplers used in each of the two organs to divide or regroup the beams from the various collimators of a given organ, which is the cause of most of the intrinsic losses in the system, to be kept small.

In another preferred embodiment of the invention, the number of collimators on each organ is even, and this number is respectively equal to four for the first collimators and to two for the second collimators. This arrangement is particularly advantageous since it allows only existing couplers to be used at one input and two outputs, and vice versa.

In this case, the first four collimators are preferably regularly spaced around the said common axis and the two collimators are arranged such that when one of them is aligned with one of the first collimators, the other is located approximately tangentially between two other first collimators.

In another embodiment of the invention, the number of the first and second collimators is respectively equal to four and to three. Compared to the previous embodiment, this arrangement is more favourable since it enables the phenomenon of power variation to be reduced during the rotation of an organ (this is then called the transmitted signal modulation phenomenon). However, it uses more complex optical fibre coupler technologies.

Advantageously, each of the first and second collimators has approximately the same section.

In another aspect of the invention, the transmission channel comprises, inside each of the first and second organs, emitting and receiving optical fibres linked to each of the first and second collimators by optical couplers enabling beams to be separated/recombined.

In the preferred embodiments of the invention, the optical fibres are multimode fibres.

BRIEF DESCRIPTION OF ILLUSTRATIONS

We shall now describe a preferred embodiment of the invention, referring to the annexed illustrations, in which.

Figure 1:
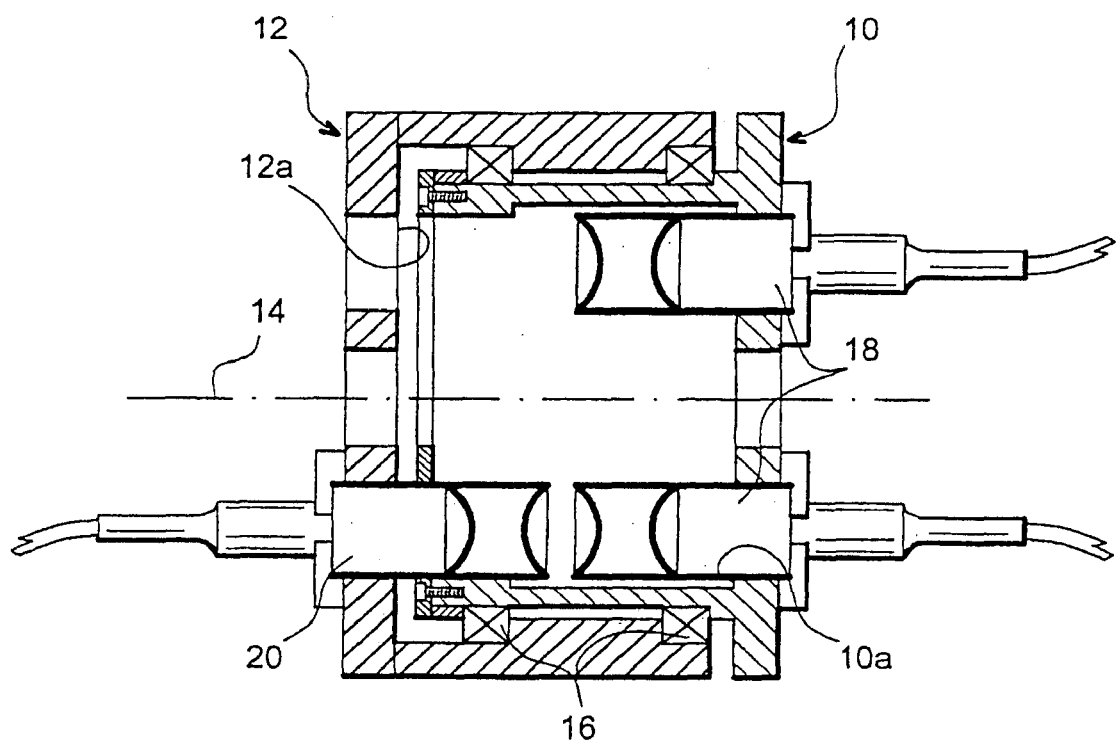
FIG. 1 is a side view, as a section, which represents a rotating optical joint constructed in accordance with the invention.
Figure 2:
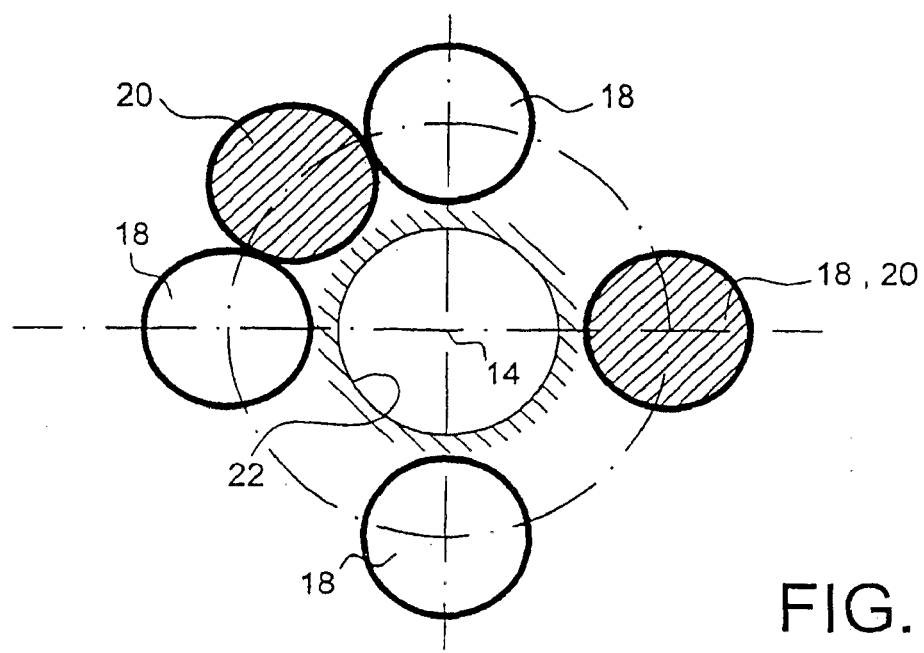
FIG. 2 is a section which illustrates diagrammatically the positioning of the collimators in the optical joint in FIG. 1.
Figure 3:
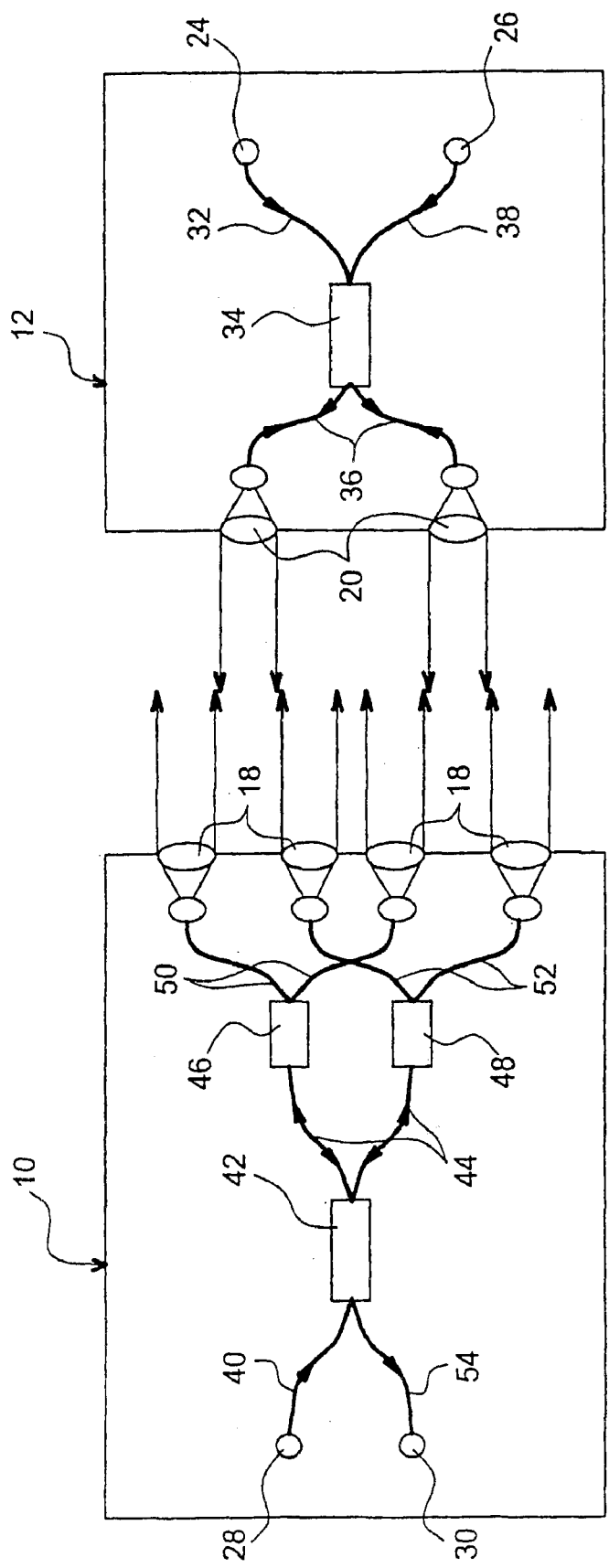
Figure 4:
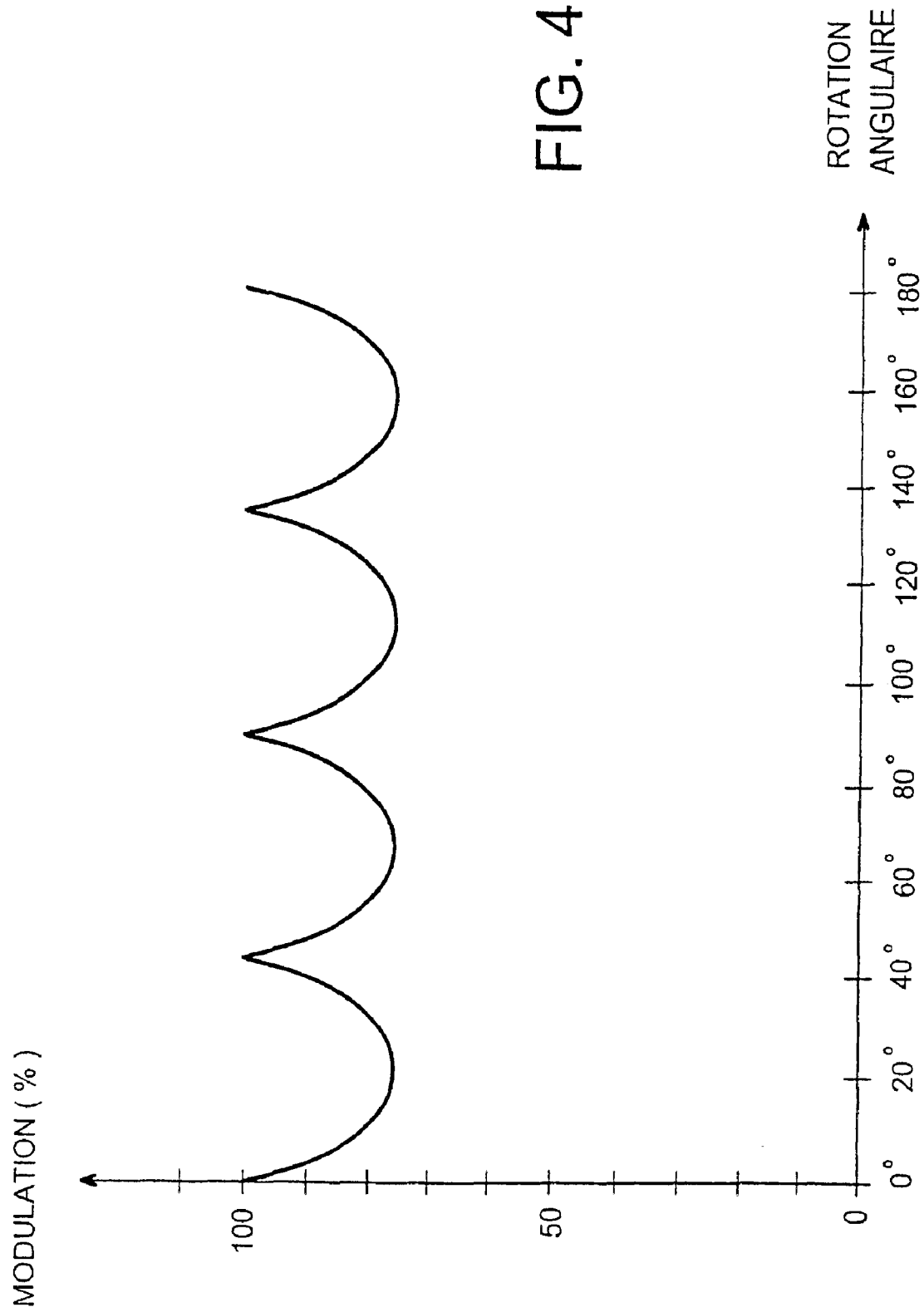
Figure 3:
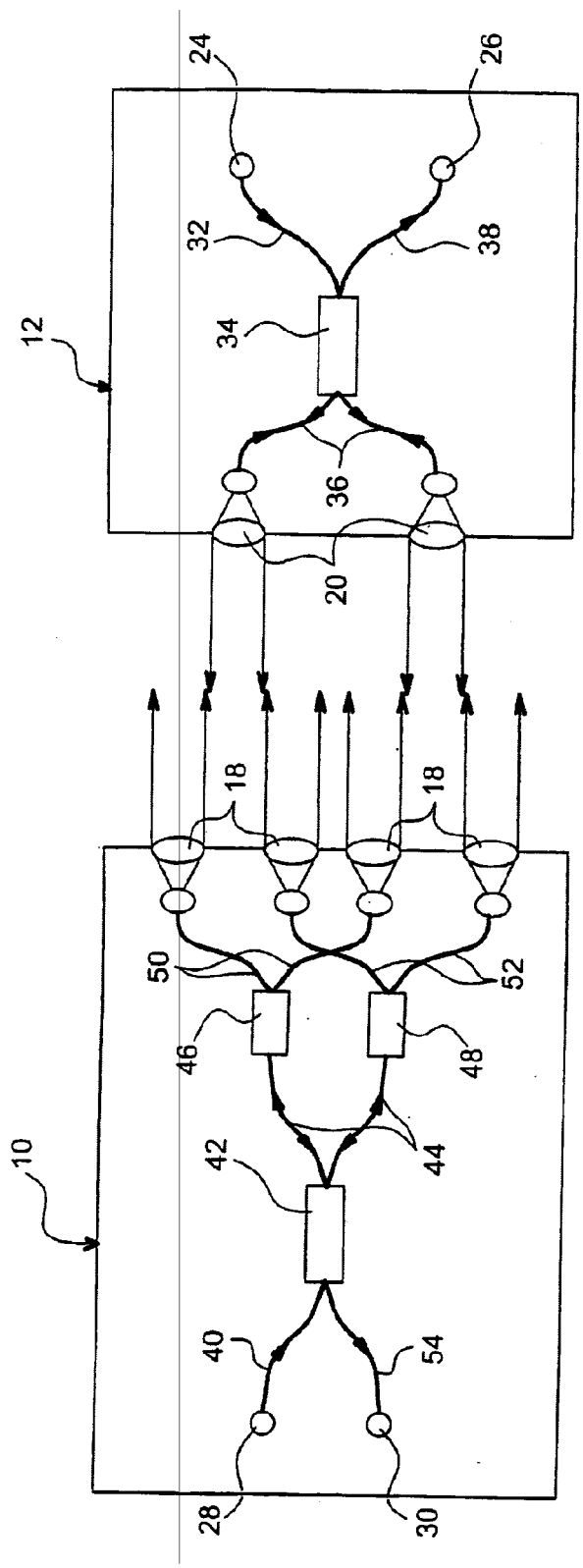
Figure 4:
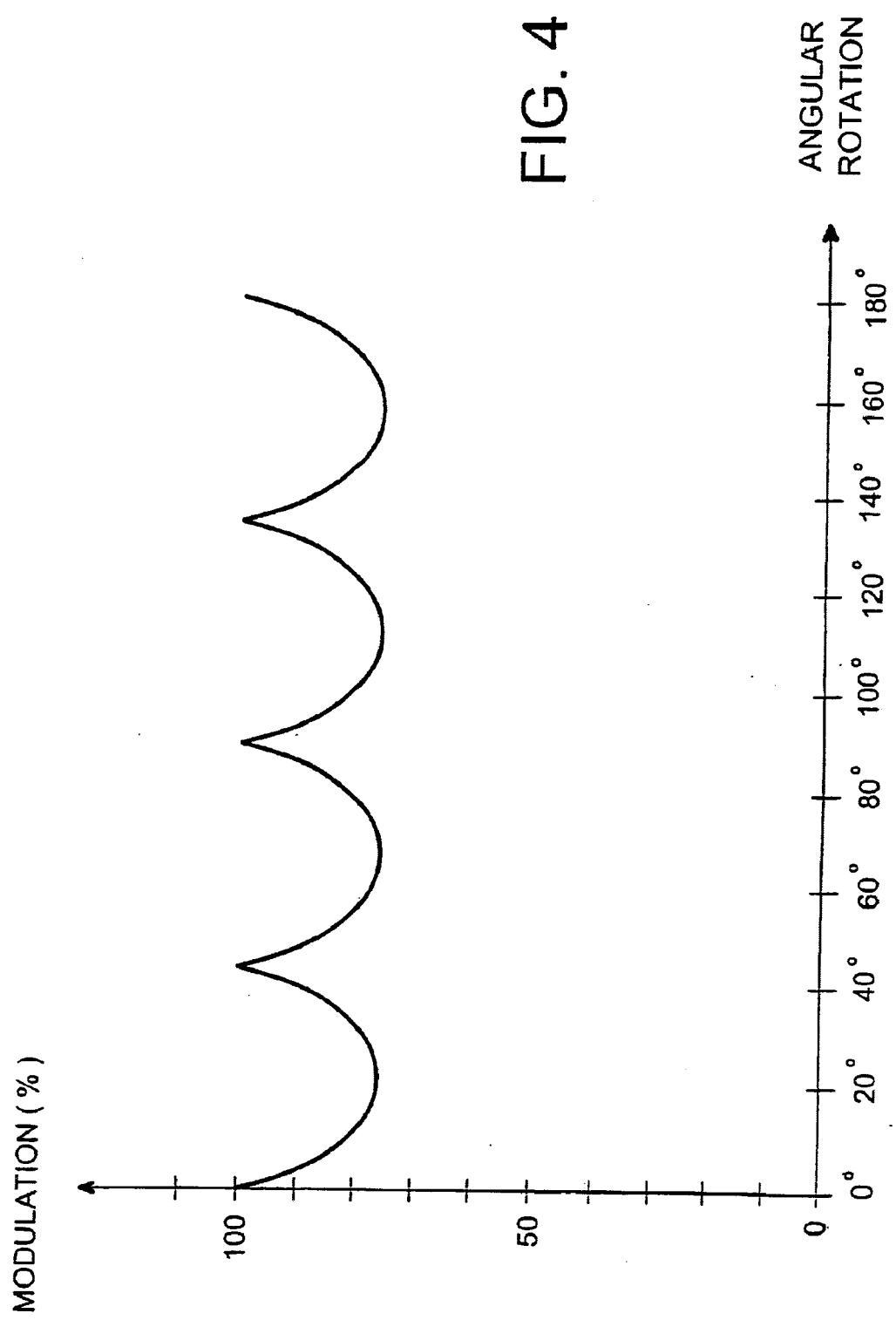

FIG. 3 is an outline diagram of the optical joint in FIGS. 1 and 2, which shows notably the optical fibre couplings and the path of the light signals; and FIG. 4 represents the change in modulation (as a percentage) of the light signals inside the optical joint in the invention, as a function of the relative angular rotation (in degrees) of the two organs constituting it, in the case of a joint with two and four collimators.

DETAILED DESCRIPTION OF A PREFERRED EMBODIMENT OF THE INVENTION

In FIG. 1 we have represented the main part of a rotating optical joint of the "off-axis" type in the invention. As this diagram illustrates, the joint comprises a first organ 10 and a second organ 12, with a common axis 14. Organs 10 and 12 are able to rotate independently of one another on this common axis 14. To this end, bearings 16 can notably be interposed between these organs 10 and 12.

As is illustrated equally by FIG. 1, the first organ 10 comprises an end face 10a located opposite an end face 12a of the second organ 12. These end faces 10a and 12a are perpendicular to axis 14 which is common to both organs.

In the preferred embodiment of the invention illustrated as an example in FIGS. 1 and 2, the first organ 10 supports four first collimators 18, and the second organ 12 supports two second collimators 20. More specifically, the first collimators 18 extend outwards from the end face 10a of the first organ 10 and the second collimators 20 extend outwards from the end face 12a of the second organ 12. Collimators 18 and 20 are thus located directly opposite one other during relative rotation of organs 10 and 12.

Each of collimators 18 and 20 have an optical axis oriented in parallel to the common axis 14 and positioned at an identical, non-zero distance from this common axis. In other words, the optical axes of collimators 18 and 20 are all offset by an identical distance compared to axis 14 which is common to organs 10 and 12.

In addition, the optical axes of the first collimators 18 are regularly spaced in relation to one another, which means that each of these optical axes is offset by an angle of 90° to the optical axes of the first adjacent collimators 18.

In addition, as FIG. 2 shows more specifically, the optical axes of the second collimators 20 are offset angularly such that, when one of these axes is aligned with the optical axis of one of the first collimators 18, the optical axis of the other second collimator 20 is positioned angularly at an equal distance between two others of the first collimators 18. More precisely, distance d between the common axis 14 and each of the optical axes of the collimators 18 and 20, together with section s of these various collimators, are determined such that the other second collimator 20 is then approximately tangential to the two other first collimators.

As an example in no way limiting of the scope of the invention, this arrangement can notably be obtained by giving distance d a value equal to 21 mm and using collimators with a useful diameter of 16 mm.

Comparable properties could, of course, be obtained by increasing or reducing these two magnitudes simultaneously, for example in order to obtain a central passage 22 of greater or lesser size, respectively.

It should be noted that for a given value of distance d, the geometrical arrangement defined above constitutes a lower limit for section s. In other words, the section of the collimators may be such that, when one of the second collimators 20 is aligned with one of the first collimators 18, the other second collimator 20 is positioned between two other collimators 18 and partially straddles the latter when the joint is seen at the end.

Collimators 18 and 20 are constituted by all optical systems able to be positioned at the end of optical fibres to emit or receive a parallel light beam. These optical systems, which are well known to those skilled in the art, habitually comprise a lens or sets of lenses allowing a divergent beam to be transformed into a collimated beam. We can mention as non-limiting examples lenses with index gradients of the GRIN type and aspherical lenses.

As FIG. 3 illustrates more specifically, the rotating optical joint in the invention also comprises a number of optical fibres and optical fibre couplers mounted on each of organs 10 and 12.

Thus, in the embodiment represented which concerns an optical joint able to operate in a bi-directional manner, the first organ 10 comprises optical fibres and optical fibre couplers enabling each of the first collimators 18 to be linked firstly to a source 28 able to emit light signals, and also to a receiver 30 of light signals. In comparable fashion, the second organ 12 comprises optical fibres and optical fibre couplers enabling each of the second collimators 20 to be linked firstly to a source 24 able to emit light signals, and also to a receiver 26 of light signals.

Sources 24 and 28 are, for example, laser diodes emitting around 1325 mm. The receivers depend on the envisaged application.

More precisely, a first optical fibre 32 links source 24 to a first optical coupler in X 34 inside the second organ 12. In addition, two optical fibres 36 link the first coupler in X 34 to each of the second collimators 20. Finally, another optical fibre 38 links the first coupler in X 34 to the receiver 26.

In comparable fashion, in the first organ 10 an optical fibre 40 links the source 28 to a second optical coupler in X 42. Two optical fibres 44 also link the second optical coupler in X 42 respectively to a third optical coupler in Y 46 and to a fourth optical coupler in Y 48. Two other optical fibres 50 link the third optical coupler in Y 46 to two of the first collimators 18, and in addition two other optical fibres 52 link the fourth optical coupler in Y 48 to the two other first collimators 18. Finally, a final optical fibre 54 links the second optical coupler in X 42 to the receiver 30 of the first organ 10.

All the couplers in the optical joint are globally balanced, such that the power of a signal is globally divided or multiplied by two when passing through each of them, give or take intrinsic losses.

The arrangement described above enables the coupler to operate in a bi-directional manner.

Thus, optical signals emitted by source 24 of the second organ 12 are conveyed by fibre 32 to the coupler 34, which divide the signals into two parts conveyed respectively by fibres 36 to each of the second collimators 20. The optical signals emitted from the latter are recovered by the first collimators 18, with a modulation which shall be described in detail subsequently. The said signals then pass to the couplers 46 and 48 through optical fibres 50 and 52. On output from couplers 50 and 52, they are conveyed to coupler 42 by optical fibres 44, before being transmitted to receiver 30 by optical fibre 54.

In comparable fashion, optical signals emitted by source 28 associated with the first organ 10 are transmitted to receiver 26 of the second organ 12 by following a reverse path.

In the rotating optical joint in the invention, the various optical fibres are advantageously multimode fibres, with a digital opening chosen such that it enables the signal modulation phenomenon to be limited whilst one organ is rotating relative to the other.

As shown by the graph in FIG. 4, the consequence of the arrangement of the collimators 18 and 20 in the invention is a cyclic variation of the modulation of the transmitted signal (as a % of half the signal), as a function of the relative angular rotation between organs 10 and 12 (in degrees).

More precisely, in the case of a configuration in which the light is conveyed by an optical fibre from the two collimators 20 to the four collimators 18, and given the usual losses of "X" and "Y" fibre couplers, the energy recovered in organ 10 is at least equal to 34% of the energy injected in organ 12 and its variation during relative rotation of organs 10 and 12 is less than 25% of the amplitude of the recovered signal.

In the case of a configuration in which the light is conveyed by an optical fibre from the four collimators 18 to the two collimators 20, and given the usual losses of "X" and "Y" fibre couplers, the energy recovered in organ 12 is at least equal to 17% of the energy injected in organ 10 and its variation during relative rotation of organs 10 and 12 is less than 25% of the amplitude of the recovered signal.

It should be noted that the total losses are the same in both directions, as a consequence of the bi-directional nature of the joint and the principle of reverse return of light.

In addition to this loss, due essentially to the geometry of the rotating optical joint in the invention, there are optical losses inherent to the presence of optical elements such as collimators 18 and 20 and couplers 34, 42, 46 and 48. In the arrangement described above, the overall optical loss of the joint (in terms of power) is estimated at approximately −12 to −15 dB.

As FIG. 2 notably illustrates, the rotating optical joint in the invention enables the entire central part of the joint near common axis 14 to be kept free, when this is necessary.

Naturally, the invention is not limited to the preferred embodiment described above. Satisfactory results may also be obtained using the first and second collimators arranged opposite one another in another arrangement, such that their total number remains less than or equal to eight. An arrangement using three first collimators and four second collimators is also satisfactory from this standpoint.

What is claimed is:

1. A rotating optical joint, comprising a first organ and a second organ, able to rotate independently of one another on a common axis and at least one channel for transmission of an optical signal between the said organs, where each transmission channel contains first collimators of the light emitted from a first optical fiber, mounted on the first organ and producing light beams approximately parallel to the common axis and offset in relation to this axis, and second collimators able to focus into a second optical fiber the collimated light originating from the first organ and mounted on the second organ, which first and second collimators are positioned approximately at an identical distance from the said common axis, in which the first and second collimators are located directly opposite one another, and where their number and their arrangement are such that their permanent variation of the power of the transmitted optical signal is less than 25%, during relative rotation of the said organs.

2. A rotating optical joint in claim 1, in which the first and second organs are hollow in the said common axis.

3. A rotating optical joint in claim 1, in which the total number of the first and second collimators is less than or equal to eight.

4. A rotating optical joint in claim 3, in which the number of the first and second collimators is respectively equal to four and to two.

5. A rotating optical joint in claim 4, in which the four first collimators are regularly spaced around the said common axis and the two second collimators are arranged such that when one of them is aligned with one of the first collimators, the other is located approximately tangentially between two other first collimators.

6. A rotating optical joint in claim 3, in which the number of the first and second collimators is respectively equal to four and to three.

7. A rotating optical joint in claim 1, in which each of the first and second collimators has approximately the same section.

8. A rotating optical joint in claim 1, in which the transmission channel comprises, inside each of the first and second organs, emitting and receiving optical fibers linked to each of the first and second collimators by optical couplers enabling beams to be separated/recombined.

9. A rotating optical joint in claim 1, in which the optical fibers are multimode fibers.

* * * * *

UNITED STATES PATENT AND TRADEMARK OFFICE
CERTIFICATE OF CORRECTION

PATENT NO.    : 6,898,346 B2
DATED         : May 24, 2005
INVENTOR(S)   : Thibaut Mercey and Jacques Sabater It is certified that error appears in the above-identified patent and that said Letters Patent is hereby corrected as shown below:

Title page,
Item [75], Inventors, please delete the name "Sabatier", and insert therefor -- Sabater --.

Drawings,
Please delete drawing sheet 2 of 3, insert therefor the attached drawing sheet 2 of 3.
Please delete drawing sheet 3 of 3, insert therefor the attached drawing sheet 2 of 3.

Signed and Sealed this

Twenty-fifth Day of October, 2005

JON W. DUDAS
*Director of the United States Patent and Trademark Office*